May 8, 1928. 1,669,161

E. FAVARY

VALVE MECHANISM

Filed March 16, 1923

INVENTOR

Ethelbert Favary

Patented May 8, 1928.

1,669,161

UNITED STATES PATENT OFFICE.

ETHELBERT FAVARY, OF NEW YORK, N. Y.

VALVE MECHANISM.

Application filed March 16, 1923. Serial No. 625,503.

The principal object of this invention is the elimination of the noise due to the clearances of valve operating mechanisms and the necessity of the frequent valve clearance adjustments as now required with internal combustion engines.

This invention consists essentially in a device embodying a springy collapsible structure which is placed in some convenient portion of the valve operating mechanism. The amount of springiness and the permissible working clearance of the structure may be predetermined. As the clearance in the valve mechanism of internal combustion engines is usually minute, I have found that a device which embodies a piston motion in a cylinder or which contains a sliding fit between the parts, is impractical, for there is some leakage past the sliding fit and the friction will cause wear. In the present invention there is no friction or sliding motion between the parts.

In the form of my invention which I now think preferable, I employ two collapsible structures, one within the other, filled entirely or partly with a fluid. When the cam of the camshaft of the engine is lifting the valve it tends to force the fluid from the inner structure into the outer, while when the valve is seated or closed the fluid flows into the inner structure, thus taking up any play or clearance existing in the valve operating mechanism. The fluid may be a gas (like air), a liquid, or a combination of these, and it may normally be contained in the device at atmospheric pressure, under compression, or in a vacuum, as may be found most practical.

In the drawings forming part of this specification, like letters denote similar parts throughout the various views.

Figure 1:
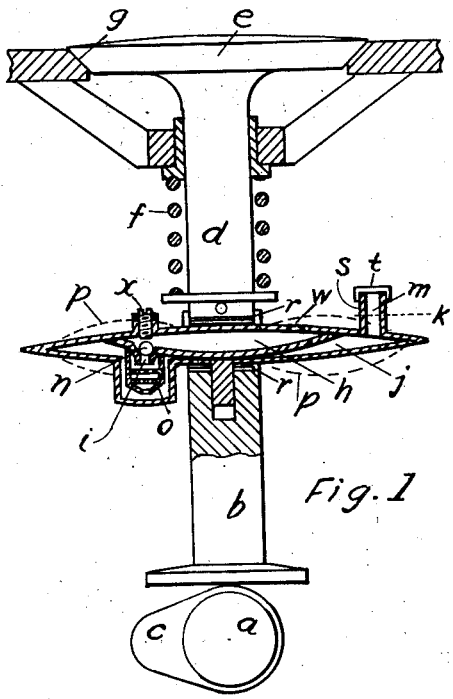
Figure 1 represents a sectional view of one form of construction embodying my invention.

In Figure 1, $a$ denotes the ordinary camshaft which as it revolves forces the push rod $b$ upward in the usual manner by the cam $c$; $d$ is the valve stem of the valve $e$, as ordinarily employed in internal combustion engines, and $f$ the valve spring which holds the valve normally on its seat $g$. The valve silencing mechanism, forming the present invention, is, in this figure, shown located between the push rod and the valve stem; it may be placed, however, in any other suitable location. $h$ is the inner collapsible structure which is closed on all sides with the exception of an opening $i$ for the passage of the fluid. $j$ is the outer structure, which may be hermetically closed to avoid the escape of the fluid from the device if this should be found desirable. The device is partially or entirely filled with the fluid, for instance, oil. It might be found preferable to use a gas, for example, air, as the working fluid or a liquid may be employed up to a certain height, for instance up to dotted line $k$, while above it, in space $m$, is air, at any desired pressure.

When the push rod is lifted by the cam action, a small portion of the fluid is slowly forced out of the inner structure $h$ and into the outer structure $j$. As the cam continues its rotation, the push rod descends to its normal position and as the collapsible structure possesses a certain springiness, it tends to spread apart, thereby enabling the fluid to flow back into $h$. In order to increase the speed at which $h$ is filled with the fluid and reduce the speed of the outflow very materially, or entirely, an automatic valve of any suitable type may be employed in the passage $i$; in the Figure 1 illustrated, as an example, at $n$, the well known ball check-valve. In operation, when there is pressure in $h$, the check valve will tend to close the passage, while when the pressure within $h$ is less than without, the check valve opens thereby enabling the fluid to flow more rapidly into the inner structure.

The check-valve $n$ is preferably not entirely pressure tight, in order to allow the fluid to escape, even if only very slowly, when the pressure on the device is high and is exerted on it continuously for a longer time than that existing under normal operation between the lifting and closing of the valve $e$. This is advantageous, for when the valve stem elongates due to a rise in temperature, it is necessary that the structure containing the fluid become less in height to compensate for the valve stem elongation, else the valve $e$ would not be entirely seated. On the other hand, when the valve stem is lifted by the cam action, if, in normal operation, the egress of the fluid from $h$ is practically prevented, there will be no play or clearance in the valve operating mechanism, and this will be conducive to silent operation; it will also increase the power of the engine as the valve lift will be greater due to the absence of clearance; this reduces the gas friction in the inlet and exhaust valve passages of the engine, thereby permitting a more thorough filling of the cylinder with the fresh explosive charge, and expelling the exhaust gases more rapidly.

A further advantage of the invention is that it will eliminate the necessity of the frequent valve clearance adjustments now required with the ordinary valve operating mechanisms. Usually, when said clearance is too small, the valve will remain open when the valve stem expands, while if the clearance is too great, the valve mechanism will be more noisy in operation. By the use of the present invention the valve operating clearance is practically eliminated, for there is only very little fluid, if any, expelled from the inner structure as the time interval between the opening and closing of the valve $e$ is normally very short. For this last reason the device is practical even without check-valve $n$; the time during which the valve $e$ is closed or seated is greater than that during which it is open, hence the device is also operative if the passage $i$ is comparatively small and no check-valve is used. Should the pressure on the structure become greater than usual, from any cause whatever, the structure would tend to bulge or assume a shape which would give it a greater volume, as shown by the dotted lines $p$ in Figures 1 and 3. If the fluid in the entire structure consists of a suitable liquid (and liquids, as is well known, are practically incompressible as compared to a gas), the device may be made of such a material, which will bulge out somewhat when the valve $e$ is lifted, due to the comparatively great pressure of the valve spring $f$. As soon as the valve is again seated, the device will resume its normal shape.

Under certain conditions it may be found best to have the fluid, be it a gas or a liquid, at a pressure above atmospheric. For instance, a liquid may be used up to height $k$, and the space $m$ above filled with air under compression, (the inner structure $h$ being entirely filled with the liquid); during operation, the fluid will be forced out of $h$ only very slowly, if at all, and should any quantity however small flow out while the cam is lifting the valve $e$, it will return as soon as the valve is again seated and the push rod returned to its normal position. When the valve $e$ is lifted and some fluid is expelled from $h$ into $j$, there will be a higher pressure in space $m$ and in the entire outer structure $j$, than there was before. However, the device is also operable if the fluid consists entirely of air, either at atmospheric pressure or under compression, or if it consists entirely of liquid.

Should the valve stem expand due to a rise in temperature, the valve $e$ would remain open, hence the valve spring $f$ would continuously exert pressure on the collapsible structure until it collapsed slightly. The comparatively slight pressure created by the springiness of the structure itself, or by the fluid within it, is sufficiently great, however, to compensate for any play or lost motion in the valve operating mechanism.

Figure 2:
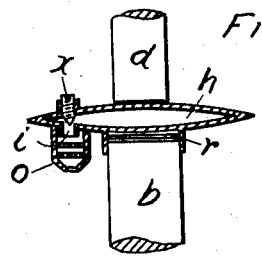
Figure 2 shows a modification embodying a single collapsible structure.

Figure 2 shows a simplified form of my device, being composed of only a single structure. If this structure is normally filled with the fluid, like air, at atmospheric pressure, some of this fluid would be forced out slowly by the pressure of the valve spring when the valve stem is lifted by the cam, and in order to prevent any noise which may be caused by the egress of the fluid, a silencer or muffler $o$ of any suitable type may be employed. In the illustration I have shown a miniature muffler of the type used on the exhaust pipe of automobile engines. Such a silencer may be found useful also with the double collapsible structure as shown in Figure 1, and whether the fluid used be a gas or a liquid, in order to prevent any noise which may arise from the egress or ingress of the fluid through passage $i$.

Figure 3:
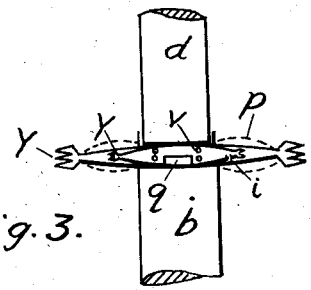
Figures 3 and 4 show diagrammatic sectional views of other modifications of my invention.

In Figure 3 is shown a coil spring $v$, which may be employed if found useful, to exert the comparatively slight pressure required to take up the play in the valve mechanism. This figure also shows a stop $q$ which may be advantageous under certain conditions to limit the working action or working depth of the device when the collapsible structure is comparatively large, or high.

In the manufacture of this device, I may provide a small nipple $s$, as shown in Figure 1, with a screw cap shown at $t$; after the working fluid is placed into the structure, the threaded cap of the nipple may be screwed tight, whereupon it may be welded to the structure to prevent its removal and to maintain the pressure in the device. Another small opening $w$ may be provided to facilitate the filling of the inner structure with the fluid; said opening may afterwards be closed in any suitable manner.

To allow more springiness or less strain in the body of the structure, corrugations $y$ may be provided, both in the inner and outer structures, or in either of them, as shown in Figure 3. These corrugations may be made in any shape or form and one of their objects is to increase the life of the device.

The structure may be made of any suitable material and it is not absolutely necessary that the material itself be of a springy nature, for when the fluid contained in it is under pressure, it will give the structure the effect of springiness since any structure containing a fluid under pressure will tend to assume the shape of a sphere. The valve stem and push rod will prevent the said collapsible structure from assuming the shape of a sphere, but in so doing they will be subjected to the reaction of the fluid pressure within the said structure. I consider it preferable in practice, however, to make the collapsible structure of a springy material like steel or bronze.

In order to regulate the amount of total clearance or the permissible working motion, small washers $r$ may be placed underneath the valve stem or on top of the push rod, as shown. The speed of egress and ingress of the fluid from, and to, the inner chamber $h$, is regulated either by the size of the opening $i$, by the check-valve $n$, by a screw $x$, Figure 2, by either of them alone or in combination, or by any other suitable means. In Figure 1 the screw $x$ is used to exert more or less pressure on the check-valve either direct as shown, or through a spring as is the common practice with all kinds of check-valves and which is too well known to require any further explanation. The check-valve may be made of steel, of rubber, or of any other suitable material. This screw $x$ may also be used for regulating the amount of total give of the structure. For example, in Figure 1, the screw $x$ can be adjusted to stop the structure from giving or collapsing further than desired by setting its position to that which may be found necessary.

Figure 4:
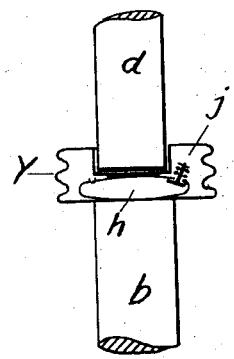

Figure 4 shows another modification where the outer structure is comparatively large.

While I have shown my invention applied to a valve mechanism of internal combustion engines, it is evident that it may be employed in other mechanisms where it is useful to eliminate play, noise, or wear.

Having now described my invention, what I claim as new and desire to protect by Letters Patent is:—

1. The combination with a valve, a valve stem, a valve spring for seating said valve, a push rod and cam operating said valve, of a collapsible springy structure between the valve and the cam, collapsibility obtained solely by flexure of the material composing the said structure, the structure containing a fluid, means for insuring slow egress and quick ingress of said fluid during the operation of the valve.

2. The combination with a valve, a valve stem, a valve spring for seating said valve, a push rod and cam operating said valve, of a collapsible springy structure between said valve and the cam, fluid within said structure and adjusting means for controlling the speed of egress of said fluid for the purpose described.

3. The combination with a valve, a valve stem, a valve spring for seating said valve, a push rod and cam operating said valve, of a collapsible springy structure between the valve and the cam, collapsibility obtained by flexure in the material comprising said structure, the width of the structure comparatively great with respect to its height, the structure containing a fluid, means for insuring slow egress and quick ingress of said fluid for the purpose described.

4. The combination with a valve, a valve stem, a valve spring for seating said valve, a push rod and cam operating said valve, of a collapsible receptacle between the valve stem and cam, a second receptacle working in conjunction with the first named receptacle, fluid contained within said receptacles, a substantially short communicating passage between the two receptacles, means for causing a portion of the fluid to pass from one receptacle to the other when the valve stem expands and while the relative position of the two receptacles with respect to each other remains the same.

5. The combination with a valve, a valve stem, a valve spring for seating said valve, a cam operating said valve, of a collapsible structure between the valve stem and cam, a second structure contiguous to the first named structure, fluid contained within said structure, a substantially short communicating passage between the two structures, means for causing a portion of the fluid to pass from one structure to the other when the valve stem expands and while one side of the structure remains stationary with respect to one side of the second structure.

6. The combination with a valve, a valve stem, a valve spring for seating said valve, a push rod and cam operating said valve, of a collapsible structure between the valve stem and cam, collapsibility obtained solely by flexure of the material composing said structure, another structure working in conjunction with the first named structure, fluid contained within said structures, means for permitting the passage of fluid from one structure to the other when the valve stem expands or contracts and means for substantially stopping such passage of fluid when the temperature of the valve stem remains substantially unchanged.

7. The combination with a valve, a valve stem, a valve spring for seating said valve, a push rod and cam operating said valve, of a collapsible springy receptacle containing fluid under pressure during the operation of the valve, another receptacle adjacent to the first receptacle and working in conjunction therewith, fluid within said second named receptacle, means for causing the fluid to flow from one receptacle into the other when the valve stem expands and while the relative position of some parts of the receptacles with respect to each other remains the same.

8. In combination with a valve operating mechanism of the type described, a collapsible springy structure, a second structure contiguous to the first named structure and a communicating passage between the two structures, fluid within said structures, means for causing the fluid to pass from one structure into the other when the valve stem expands, means for permitting a collapsing of one of the structures while the relative position of some parts of both structures with respect to each other remains the same.

9. The combination with a valve, a valve stem, a valve spring for seating said valve, a push rod and cam operating said valve of a collapsible hermetically closed springy structure between the valve and the cam, a second collapsible structure within the first named structure, a communicating passage between the two structures, for the purpose described.

10. The combination with a valve, a valve stem, a valve spring for seating said valve, a push rod and cam operating said valve of a collapsible hermetically closed springy structure between the cam and the valve, a second collapsible structure within the first named structure, a communicating passage between the two structures, a check valve controlling the opening of said passage for the purpose described.

11. The combination with a valve, a valve stem, a valve spring for seating said valve, a push rod and cam operating said valve, of a collapsible closed receptacle between the valve stem and cam, a second receptacle contiguous to the first named receptacle, means for causing the two receptacles to be moved in their entirety with the push rod, fluid contained within the receptacles, means for causing the fluid to communicate between the two receptacles while their relative position with respect to each other remains unchanged.

12. In combination with a valve operating mechanism of the type described, a collapsible receptacle, a second receptacle working in conjunction with the first named receptacle, fluid within said receptacles, means for permitting the collapsing of one receptacle while the relative position of some parts of both receptacles with respect to each other remains the same, means for permitting the passage of fluid from one receptacle to the other when the valve stem expands or contracts and for practically stopping the passage of such fluid during the normal operation of the valve, when the valve stem length remains unchanged.

13. The combination with a valve, a valve stem, a valve spring for seating said valve, a cam for lifting said valve, of a collapsible receptacle interposed between the valve stem and the cam, a second receptacle contiguous to the first said receptacle, means for permitting a rapprochement between parts of the two receptacles solely by flexure of the parts composing said receptacles, fluid within the receptacles, means for insuring egress of fluid from one of the receptacles and ingress into the other receptacle when the valve stem expands.

14. In combination with a valve operating mechanism of the type described, a collapsible springy structure, a second collapsible structure within the first named structure, a communicating passage between the two structures, fluid within said structures, means for permitting the fluid to pass from one structure to the other when the distance in the valve operating mechanism between the cam and the valve is changed.

15. In combination with a valve operating mechanism of the type described, a hermetically closed, collapsible structure, a second collapsible structure within the first named structure, a communicating passage between the two structures, fluid within said structures and means for permitting the passage of fluid from one structure to the other when the valve stem expands.

16. In combination with a valve operating mechanism of the type described, a receptacle having a changeable volume, a second receptacle adjacent to the first named receptacle, fluid within the receptacles, means for causing the passage of fluid from one receptacle to the other when the distance in the valve operating mechanism between the cam and the valve is changed and when the volume of a receptacle is changed, the change in volume of the receptacle obtained solely by flexure of the material composing the receptacles.

Signed at New York in the county of New York and State of New York, this 14th day of March, A. D. 1923.

ETHELBERT FAVARY.